United States Patent [19]

Van Roosmalen

[11] 4,266,248

[45] May 5, 1981

[54] DEVICE HAVING A CAMERA TUBE

[75] Inventor: Johannes H. T. Van Roosmalen, Eindhoven, Netherlands

[73] Assignee: U.S. Philips Corporation, New York, N.Y.

[21] Appl. No.: 942,323

[22] Filed: Sep. 14, 1978

[30] Foreign Application Priority Data

Oct. 18, 1977 [NL] Netherlands ........................ 7711392

[51] Int. Cl.[3] ................................................ H04N 5/30

[52] U.S. Cl. ................................ 358/223; 315/31 TV

[58] Field of Search ........ 358/223; 315/31 R, 31 TV, 315/382, 383

[56] References Cited

U.S. PATENT DOCUMENTS

| | | | |
|---|---|---|---|
| 2,931,937 | 4/1960 | DufFour | 315/31 TV |
| 3,371,206 | 2/1968 | Takizawa | 315/31 R |
| 3,548,250 | 12/1970 | Van Roosmalen et al. | 315/31 TV |
| 3,651,370 | 3/1972 | Goto | 315/31 R |
| 3,831,058 | 8/1974 | Van Roosmalen | 315/31 TV |
| 3,883,773 | 5/1975 | Van Roosmalen et al. | 358/223 |

*Primary Examiner*—Joseph A. Orsino, Jr.
*Attorney, Agent, or Firm*—Thomas A. Briody; David R. Treacy; Marc D. Schechter

[57] ABSTRACT

A device having a camera tube of the vidicon type. During flybacks of the deflection, the beam current and the cathode potential is increased so as to achieve the so-called anti-comet tail effect. In order to ensure that the beam lands on the radiation sensitive layer perpendicularly everywhere during flybacks, as well as during scanning of the target, the electron beam is focused at the deflection point of the deflection coils during the flyback.

2 Claims, 1 Drawing Figure

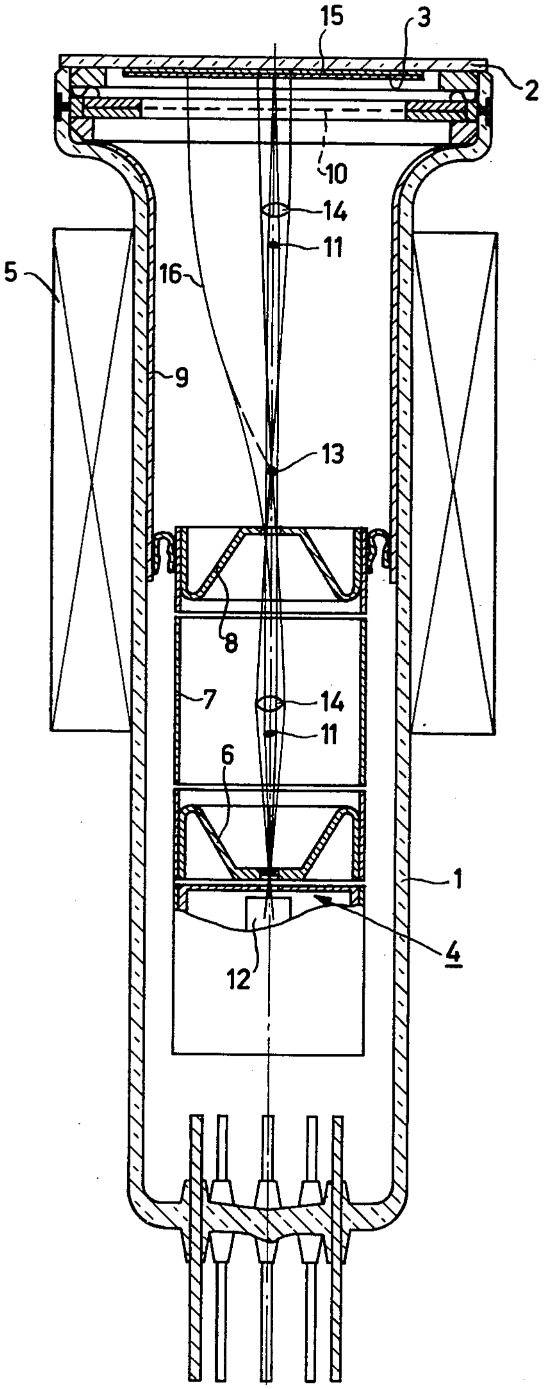
15
3
2
10
14
11
5
16
9
13
8
7
14
11
6
1
4
12

DEVICE HAVING A CAMERA TUBE

The invention relates to a device having a camera tube of the vidicon type comprising an electron gun for generating an electron beam, deflection coils for deflecting the electron beam over a radiation-sensitive layer, means for focusing the electron beam and means for directing the deflected electron beam perpendicularly onto the radiation-sensitive layer. In such a device the cathode potential of the electron gun during flybacks of the deflection is increased with respect to the radiation-sensitive layer while simultaneously increasing the current strength of the electron beam.

Such a device is disclosed in U.S. Pat. No. 3,548,250.

In a vidicon, a radiation-sensitive layer, for example a photoconductive layer, or a pyroelectric layer, is scanned by means of a beam of slow electrons. The electron beam should impinge perpendicularly on the radiation-sensitive layer. For that purpose, a vidicon is provided with an electron lens, e.g. a collimation lens which directs the deflected beam parallel to the axis of the tube. This electron lens generally comprises, inter alia, a gauze-like electrode immediately in front of the radiation-sensitive layer.

The above U.S. patent states that the potential differences on the radiation-sensitive layer which result from the image projected thereon, are always reduced again to the cathode potential by the scanning electron beam.

Sometimes, however, these potential differences are so large—due to local excessive exposure to light—that the electron beam is not capable of doing this. Moving dots of high light intensity may then produce so-called comet tails in the displayed picture. According to the U.S. patent this disadvantage is avoided by reducing excessively large potential differences on the radiation-sensitive layer to an acceptable level by the electron beam during flybacks of the deflection. Regions having potential differences which are not too large are not affected. This is done by increasing the cathode potential by, for example, 5 Volts, so that all potential differences above 5 V are reduced to 5 V. This is done with a greatly increased beam current and preferably a defocused beam. Since this occurs during flybacks, the picture signal is not influenced.

It has been found to be of great importance to reduce the too large potential differences to an accurately determined level. Variations of this level prove to be visible in the displayed picture. Moving dots of high light intensity, for example, do show comet tails in some parts of the picture and do not show these in other parts. The occurrence and disappearance of the comet tails in the displayed picture is annoying to the viewer. This disadvantage proves to occur of course in the device disclosed in the aforementioned United States patent.

It is the object of the invention to provide a device of the kind mentioned in the preamble in which excessive potential differences are reduced to an accurately determined level.

For that purpose, according to the invention, the electron beam is focused substantially in the deflection point of the deflection coils during flybacks.

The invention is based on the following understanding. As already stated, the electron beam, during flybacks, should preferably be strongly defocused at the area of the radiation-sensitive layer. This is done by focusing it at a different point. By choosing for this point the deflection point of the deflection coils, not only does the electron beam land perpendicularly on the radiation-sensitive layer during the sweeps, but also does this during the flybacks, because then all electrons of the defocused beam pass through the deflection point, and the collimation lens is constructed so that the electron paths are directed parallel to the axis of the tube and hence perpendicularly to the radiation-sensitive layer.

The invention will now be described in greater detail with reference to the accompanying drawing of a television camera tube having deflection coils according to the invention.

The tube shown in the FIGURE comprises a glass envelope 1 having a face plate 2. The face plate 2 is provided with a photoconductive layer 3 on a transparent conductive signal plate 15. The photoconductive layer 3 is scanned by an electron beam which is generated by an electron gun 4 and is deflected by deflection coils. 5. The electron beam is focused by a focusing lens comprising the electrodes 6, 7 and 8 and, also when it is deflected, impinges on the photoconductive layer 3 perpendicularly under the influence of the collimation lens comprising the electrode 9 on the inner wall of the tube and the gauze-like electrode 10 immediately in front of the photoconductive layer 3. See, for example, the deflected electron beam 16.

During the sweeps of the deflection which generally occurs according to the known television frame, the electron beam is focused on the layer 3 to a spot which is as small as possible. This beam is denoted by 11. As stated previously, the electron beam is strongly defocused at the area of the layer 3 during the flybacks, in which the potential of the cathode 12 of the electron gun is also increased, for example, by 5 V and the beam current is strongly increased. Until now the defocusing has been carried out by focusing the electron beam at a point immediately adjacent the electron gun, as appears from U.S. Pat. No. 3,548,250. According to the invention, however, the electron beam is focused by the focusing lens (6,7,8) at the deflection point 13 of the deflection coils 5. The defocused beam is shown at 14. Although the electron beam 14 impinges on the layer 3 with a wide spot, all electrons nevertheless originate from the deflection point 13 and land on the layer 3 perpendicularly due to the influence of the collimation lens 9, 10.

What is claimed is:

1. An apparatus having a camera tube of the vidicon type including a radiation-sensitive layer, an electron gun for generating an electron beam, means for focusing the electron beam, and means for deflecting the electron beam over the radiation-sensitive layer, said tube further including means for directing the deflected electron beam perpendicularly onto the radiation-sensitive layer, the improvement wherein the focusing means focuses the electron beam substantially at a spot corresponding to the deflection point of the deflection means during flyback.

2. The apparatus according to claim 1 wherein said electron gun includes a cathode and during flyback the cathode potential with respect to the radiation-sensitive layer and the current strength of the electron beam is increased.

* * * * *